US012759930B2

(12) United States Patent
Heiss-Chouquet et al.

(10) Patent No.: US 12,759,930 B2
(45) Date of Patent: Oct. 13, 2026

(54) FLEXIBLE INORGANIC ELEMENT AND METHOD FOR ITS PRODUCTION

(71) Applicants: SCHOTT AG, Mainz (DE); SCHOTT Glass Technologies (Suzhou) Co. Ltd., Suzhou New District (CN)

(72) Inventors: Markus Heiss-Chouquet, Bischofsheim (DE); Wei Xiao, Suzhou Wuzhong District (CN); Volker Seibert, Ingelheim (DE); Vanessa Glässer, Mainz (DE); Sebastian Leugner, Gernsheim (DE); Fabian Wagner, Mainz (DE); Feng He, Suzhou New District (CN); Julia Weisshuhn, Mainz (DE)

(73) Assignees: SCHOTT AG, Mainz (DE); SCHOTT GLASS TECHNOLOGIES (SUZHOU) CO. LTD., Suzhou New District (CN)

( * ) Notice: Subject to any disclaimer, the term of this patent is extended or adjusted under 35 U.S.C. 154(b) by 327 days.

(21) Appl. No.: 18/360,989

(22) Filed: Jul. 28, 2023

(65) Prior Publication Data

US 2024/0034671 A1 Feb. 1, 2024

(30) Foreign Application Priority Data

Jul. 29, 2022 (EP) .................................... 22187862

(51) Int. Cl.
*C03C 23/00* (2006.01)
*C03C 3/064* (2006.01)
(Continued)

(52) U.S. Cl.
CPC .......... *C03C 23/0025* (2013.01); *C03C 3/064* (2013.01); *C03C 3/066* (2013.01);
(Continued)

(58) Field of Classification Search
CPC ....... G06F 1/1652; G09F 9/301; C03C 15/00; C03C 2218/33; E05D 1/02
See application file for complete search history.

(56) References Cited

U.S. PATENT DOCUMENTS

2013/0216740 A1* 8/2013 Russell-Clarke ...... B21D 31/04 219/121.72
2015/0049428 A1* 2/2015 Lee ...................... G06F 1/1652 361/679.27

(Continued)

FOREIGN PATENT DOCUMENTS

DE 102018100299 8/2018
EP 3936485 1/2022

(Continued)

*Primary Examiner* — Alicia J Weydemeyer
(74) *Attorney, Agent, or Firm* — Ruggiero McAllister & McMahon LLC

(57) ABSTRACT

An element of an inorganic brittle material is provided having two opposed sides and a circumferential edge. The element has at least three sections that include a first section and two second sections. The second sections adjoin the first section so that the first section is between the second sections. The first section has an arrangement of openings and interconnectors so that the first section has a higher flexibility than the second sections. The arrangement of openings has at least one opening shaped as a fold with two limbs that intersect to form a vertex.

19 Claims, 8 Drawing Sheets

(51) Int. Cl.

| | |
|---|---|
| ***C03C 3/066*** | (2006.01) |
| ***C03C 3/078*** | (2006.01) |
| ***C03C 3/083*** | (2006.01) |
| ***C03C 3/085*** | (2006.01) |
| ***C03C 3/087*** | (2006.01) |
| ***C03C 3/089*** | (2006.01) |
| ***C03C 3/091*** | (2006.01) |
| ***C03C 3/093*** | (2006.01) |
| ***C03C 4/00*** | (2006.01) |
| ***C03C 15/00*** | (2006.01) |
| ***C04B 41/00*** | (2006.01) |

(52) U.S. Cl.

CPC .............. *C03C 3/078* (2013.01); *C03C 3/083* (2013.01); *C03C 3/085* (2013.01); *C03C 3/087* (2013.01); *C03C 3/089* (2013.01); *C03C 3/091* (2013.01); *C03C 3/093* (2013.01); *C03C 4/0071* (2013.01); *C03C 15/00* (2013.01); *C03C 2204/00* (2013.01); *C04B 41/0036* (2013.01)

(56) References Cited

U.S. PATENT DOCUMENTS

| | | | | |
|---|---|---|---|---|
| 2018/0215647 | A1 | 8/2018 | Ortner | |
| 2021/0070650 | A1* | 3/2021 | Da | C03C 3/085 |
| 2021/0192989 | A1 | 6/2021 | Ahn | |
| 2022/0198964 | A1 | 6/2022 | Cho | |

FOREIGN PATENT DOCUMENTS

| | | | | |
|---|---|---|---|---|
| KR | 20230049573 A | * | 4/2023 | H04M 1/0268 |
| WO | 2013123353 | | 8/2013 | |
| WO | 2020226939 | | 11/2020 | |
| WO | 2020227924 | | 11/2020 | |

* cited by examiner

FIG. 10a
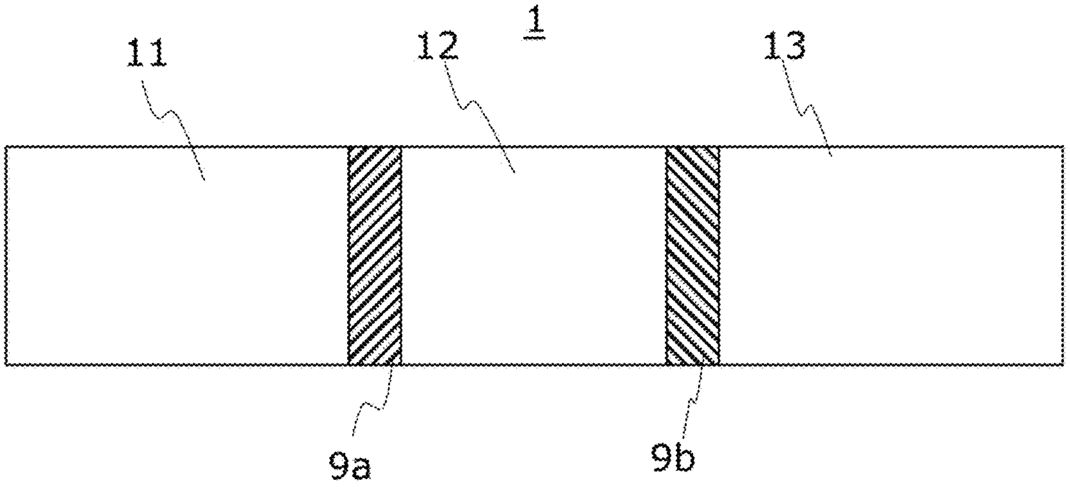
FIG. 10b
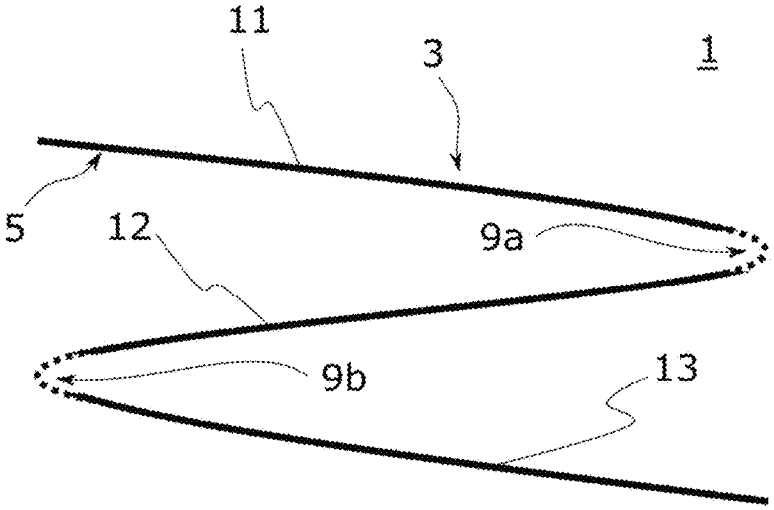
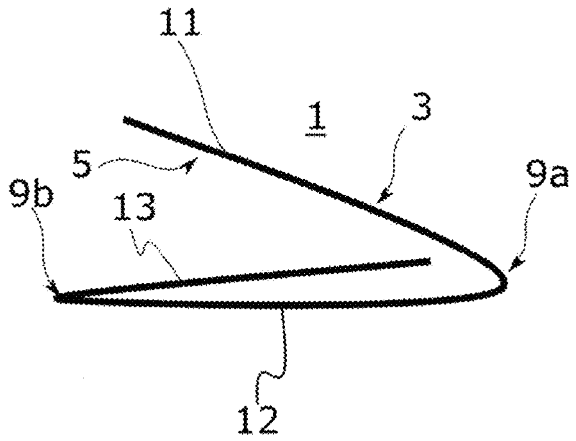
FIG. 10c
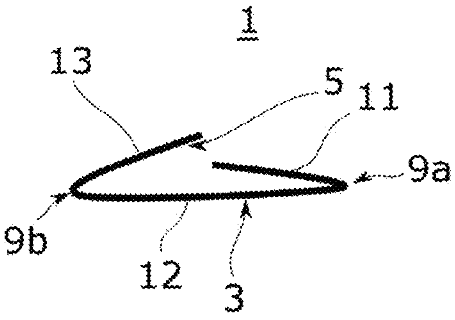
FIG. 10d

FLEXIBLE INORGANIC ELEMENT AND METHOD FOR ITS PRODUCTION

CROSS REFERENCE TO RELATED APPLICATIONS

This application claims benefit under 35 USC § 119 of European Application 22187862.2 filed Jul. 29, 2022, the entire contents of which are incorporated herein by reference.

BACKGROUND

1. Field of the Disclosure

The present disclosure relates to a flexible element comprising an inorganic, brittle material, as well as a method for its production. In particular, the present disclosure relates to a flexible glass element.

2. Description of Related Art

Inorganic material have high temperature stability and hardness. However, these materials tend to be brittle, so that in case a material for a flexible element is needed, brittle materials usually are not the material of choice.

However, in recent years, efforts have been made to use high transparency glass elements with increased flexibility for use as covers for display devices or the like. Usually, in order to increase flexibility in glass elements such as glass sheets their thickness is reduced. However, by decreasing the thickness of a glass element, its strength, such as impact strength, also decreases. This may be compensated for by using sandwich designs using polymer and glass elements and combining them, by way of example, via a lamination process. However, sandwiches are prone to delamination and further light transmission through such a sandwich laminate may be reduced as a result of refractive index steps at the interfaces. The above pros and cons also apply to other inorganic brittle materials and are not restricted to glass elements only.

Therefore it has been proposed to provide elements of an inorganic brittle material comprising at least three sections, wherein a first section is adjoined by two second sections so that the first section is arranged between the second sections. The first section is formed so as to have a higher flexibility as the second sections. This may be achieved by either slimming that portion of the element that is to become a "first section" or by introducing holes, which may be through-holes or blind holes in the element's future "first section". For example, a first section may have an arrangement of openings that form passages through the element, i.e., between one side and the other side of the element. Slimming as well as introducing holes in a first section leads to the first section having a higher flexibility than the second sections, such that the first section may also form a hinge section for the second sections. With other words, the first section is a bending section. Commonly used structures, for example, are described in EP 3 936 485 A1, WO 2020/226939 A1 and WO 2013/123353 A1, and comprise parallel lines or groves oriented in parallel to the bending axis and that are interconnected by ridges (that may also be called interconnectors).

Quite commonly, such holes are filled with a refractive index matched filler material, for example with plastics or rubbers or adhesives. However, a 100% perfect match of refractive indices of filler material and inorganic brittle material, such as glass, is not possible, which leads to optical distortion. The roughness of the openings' walls further adds to optical distortion. This is a major drawback of the proposed parallel structures to the state of the art, as upon being used as covers for an electro-optical devices, such as a display, optical interference phenomena, such as the Moiré effect, will result.

Other patterns comprising holes shaped differently than the aforementioned elongated parallel holes have been proposed. For example, patterns may include round, square or rhomboid structures.

However, these structures still are shaped symmetrically and are not optimized for unidirectional bending of the element. In particular, the regular, periodic arrangement of the holes generally results in perceptible Moiré patterns if such a perforated glass sheet is used as a cover for a pixel display.

SUMMARY

The object of the present disclosure therefore is to provide an inorganic brittle material element comprising a bending section that overcomes the drawbacks of the state of the art at least partially. A further object is to provide a method for producing such an element.

The disclosure therefore relates to an element of an inorganic brittle material that has two opposite sides and a circumferential edge. The element comprises at least three sections including a first section and two second sections adjoining the first section so that the first section is arranged between the second sections. The first section comprises an arrangement of openings and interconnectors so that the first section has a higher flexibility than the second sections. At least one of the openings is shaped as a fold that comprises at least limbs that intersect, thereby forming a vertex.

In the scope of the disclosure, a fold is understood as referring to a bent or curved shape of the opening that has at least two limbs that intersect, thereby forming a vertex or hinge. For example, the opening may be shaped like a chevron or generally V-shaped or U-shaped. Further, it is understood that in the sense of the disclosure, a fold is understood to any shape that shows a reversal of direction. In that sense, an arc is also understood as a fold, as well as dome-shaped openings. The vertex may in case of circular arcs also be understood as a turning point, for example a minimum or maximum, particularly in a direction along or parallel to the bending axis. The opening's boundaries may be straight lines, but it is also possible and may also be preferred that the boundaries are sinusoidally shaped or irregularly shaped. By way of example, exemplary shapes of openings shaped as folds in the sense of the disclosure are depicted schematically and not drawn to scale in FIGS. 6, 8 and 9.

Such a shape of the opening has been found to be very advantageous by the inventors in terms of bending stress reduction. That is, as there is a reversal of direction along the pathway of the fold-like shaped opening, upon bending the element the interconnectors next to the fold-like shaped opening may be lifted. It has been shown that this significantly helps to reduce mechanical stresses in the interconnectors.

Preferably, according to an embodiment, the element comprises at least two fold-shaped openings that are adjacent to each other, and the interconnector between these openings forms a protrusion.

In that case, also the interconnector may be shaped as a fold with at least two limbs that intersect, for example, in a chevron-like shape.

It may be preferred that all openings are formed as folds.

According to a further embodiment, the first section defines a bending direction for the second sections, and an angle is drawn between the bending direction and at least one of the limbs of the fold and/or the interconnector. That is, the pattern of openings and interconnectors is tilted with regard to the bending direction, the openings being neither in parallel to the bending direction nor at a right angle. This is favourable for decreasing interference effects between the pattern of openings in the first section and an underlying pixel array in case the element is used as a cover for a display or other devices comprising pixel arrays. However, as tilted unidirectional openings would, upon bending, lead to an increase in bending stress, the present disclosure proposes to introduce first sections in elements that comprise at least one opening shaped as a fold with two intersecting limbs.

In that way, a decrease of interference effects may be combined with a decrease in bending stress in a very simple and efficient manner.

The most preferred material for the element is glass. However, it is also contemplated to fabricate the element using another brittle material such as a glass ceramics, sapphire or a semiconductor such as silicon.

Independent from the material used, the element may be easily bend and even folded at the flexible first section. Thus, it is also contemplated to provide an article comprising a flat element according to this disclosure, whereby the flat element is bent and folded at the first section so that the surfaces of the second sections of one of the sides face each other. Further, the element may be easily bent so far that the surfaces of the second sections facing each other are parallel or are at least positioned in an acute angle. However, it is also possible that second section form a "negative angle", meaning that the outer ends of second sections may be closer to each other than the inner ends, that is, the ends next to the first section.

As well, the second sections can be brought close together, specifically if the flexible first section is sufficiently broad. The second sections can be positioned close together if the flexible first section has the freedom to bulge outwards. Thus, according to a refinement, the flat element is folded and the surfaces of the second sections facing each other are positioned so close together that the first section bulges outward so that the thickness of the folded flat element is larger at the first section than at the boundary lines between the first section and the second sections. As well, the thickness of the folded flat element in this case is larger at the first section than at a position where the second sections are opposed.

The decrease of maximum tensile strain can improve the flexibility, that is, in the scope of the present disclosure, the bendability of a given glass sheet and/or the structured section, of the structured section significantly. The minimum bending radius, and, thus the flexibility, of a glass can for example be expressed by the gap in 2 point bending test setup at breakage. According to a preferred embodiment, the flexibility of the structured part, i.e., the first section is at least 2 times, preferably at least 3 times, most preferably at least 4 times higher compared to the non-structured part, i.e., the second sections. The flexibility generally is understood as being proportional to the inverse stiffness of the element. Specifically, the flexibility f may be defined as $f=\alpha/F$ with F being a force applied to one of the second sections along its surface normal and $\alpha$ being the bending angle resulting therefrom, i.e., the angle between the two second sections. The 2 point bending is a test to measure the bending strength or bending performance of glass. The breakage bending radius is determined by using a UTM (universal testing machine) on samples at room temperature of about 20° C. and relative humidity of about 50%. The glass element is brought into a bent position and its opposite ends are positioned between two parallel plates (steel plates). Then the distance between the plates is lowered so that the bending radius of the glass element decreases wherein the loading speed is, e.g., 60 mm/min. The distance between the plates is recorded when the glass element is kinking or damaging or breaking into two or several pieces which is determined by the signal of the UTM software. From that distance, the corresponding bending radius of the glass element at the time of breakage is calculated. The flexibility is inversely proportional to the distance of the plates. Thus, if the structured part has a flexibility that is two times higher than the flexibility of the unstructured sections, the distance of the plates can be halved before breaking. This two-point bending test is adjusted and is especially suitable for ultra-thin glass elements. Due to the flexibility of the elements as described herein, the method can be employed perfectly. The testing method is also described in Applicant's own application EP 3 936 485 A1, which is incorporated herein by reference.

Chemically toughening of glass can improve the flexibility further, for both structured and non-structured parts.

Typically, a molten salt is used for chemical toughening that contains $Na^+$- or $K^+$-ions or a mixture of these. Commonly used salts are $NaNO_3$, $KNO_3$, NaCl, KCl, $K_2SO_4$, $Na_2SO_4$, $Na_2CO_3$, and $K_2CO_3$. Additives like NaOH, KOH and other sodium or potassium salts may be also used for better controlling the speed of ion-exchange, CS (compressive stress) and DoL (depth of layer) during chemical toughening. Further, an $Ag^+$-containing or $Cu^{2+}$-containing salt bath could be used to add anti-microbial function to the glass. The chemical toughening is not limited to a single step process. It can also include multi steps of immersing the glass disk into salt baths with alkaline metal ions of various concentrations to reach better toughening performance.

Thus, the chemically toughened glass article according to the disclosure can be toughened in one step or in the course of several steps, e.g., two steps.

According to some embodiments, the element can be chemical toughened to reach CS (i.e., a compressive stress at the surface) higher than 100 MPa, preferably higher than 250 MPa, preferably higher than 400 MPa, more preferably higher than 500 MPa, more preferably higher than 600 MPa, or even higher than 700 MPa, or even higher than 800 MPa. However, it is preferred to limit the compressive stress so as to maintain a sufficient flexibility. Thus, in a further embodiment the CS is lower than 1500 MPa, preferably lower than 1300 MPa, more preferably lower than 1200 MPa. Further, the element can be chemical toughened to reach a DoL (DoL="depth of layer") higher than 1 μm, preferably higher than 3 μm, more preferable higher than 5 μm, more preferably higher than 7 μm, more preferably higher than 8 μm, more preferably higher than 10 μm, more preferably higher than 12 μm, most preferably higher than 15 μm. However, it is advantageous to limit the DoL with respect to the thickness of the glass element. According to further embodiments, therefore, the DoL is lower than $0.5 \cdot t$, preferably lower than $0.4 \cdot t$, most preferable lower than $0.3 \cdot t$, where t is the glass thickness. The DoL value is the depth into the surface of the glass to which compressive stress is introduced. It is defined as the distance from the physical surface to the zero stress point internal to the glass.

The structured and non-structured part may advantageously be toughened together (in a common toughening step), so the CS and DoL values are measured based on the non-structured part. In general, however, it may also be contemplated to toughen both sides of the glass sheet differently. In any case, the flexibility of the structured and non-structured parts can be improved by chemical toughening. As measured using the 2PB bending test, the bending radius of the test samples can be roughly calculated as bending radius r=d/2.4, where d is the distance between two plates in the 2 point bending test. According to some embodiments of the element, the chemically toughened structured first section can be bent with a bending radius below 500t, preferably below 300t, more preferably below 100t, more preferably below 50t, more preferably below 40t, more preferably below 30t, more preferably below 25t, more preferably below 20t, more preferably below 15t, more preferably below 10t, more preferably below 7.5t, more preferably below 5t, more preferably below 4t, more preferably below 3t, or even below 2t without breakage, where t is the glass thickness.

BRIEF DESCRIPTION OF THE DRAWINGS

FIGS. 10*a*-10*d* and 11*a*-*b* show embodiments of an element with more than one first section.

DETAILED DESCRIPTION

Figure 1:
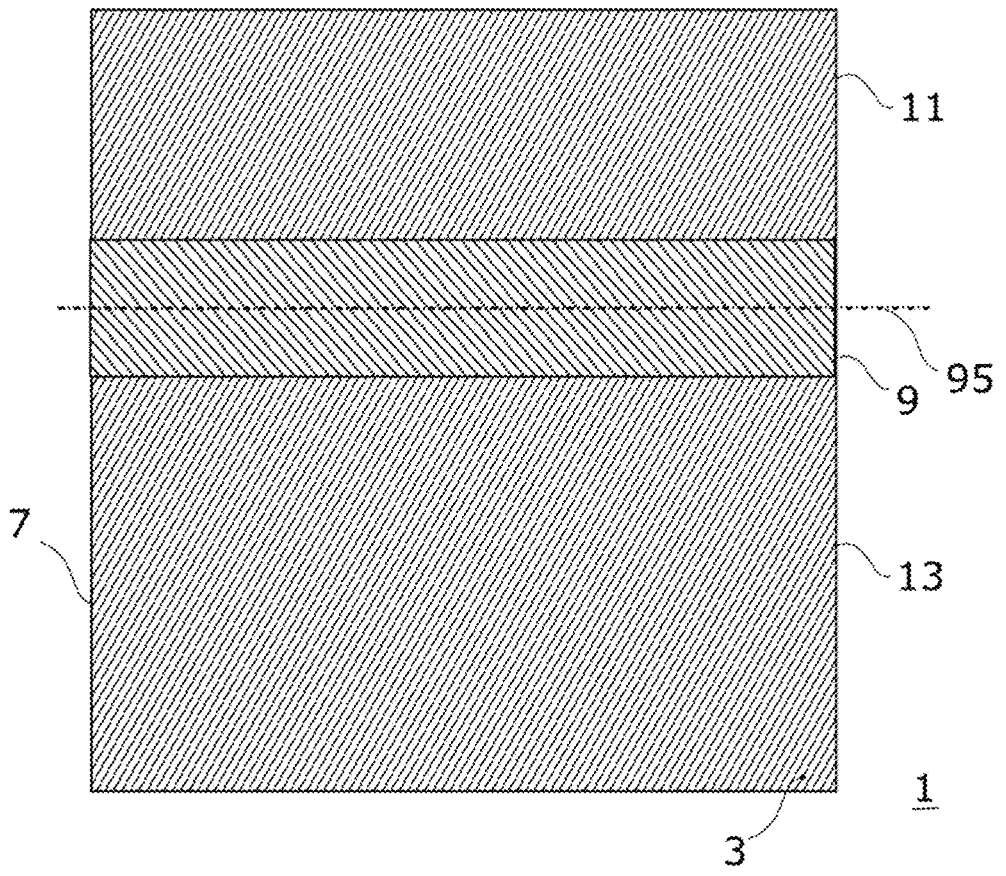
FIG. 1 shows an element of inorganic brittle material with differently structured adjoining first and second sections.

FIG. 1 is a schematic and not drawn to scale plain view of inorganic brittle material element 1 with side 3 of element 1 facing the observer. Element 1 comprises a circumferential edge 7 and three sections 9, 11 and 13. Sections 11 and 13 are each formed as second sections, whereas section 9 is formed as a first section. Second sections 11 and 13 adjoin first section 9 so that first section 9 is arranged between second sections 11 and 13. First section 9 defines a bending direction 95 for second sections 11 and 13.

Figure 2:
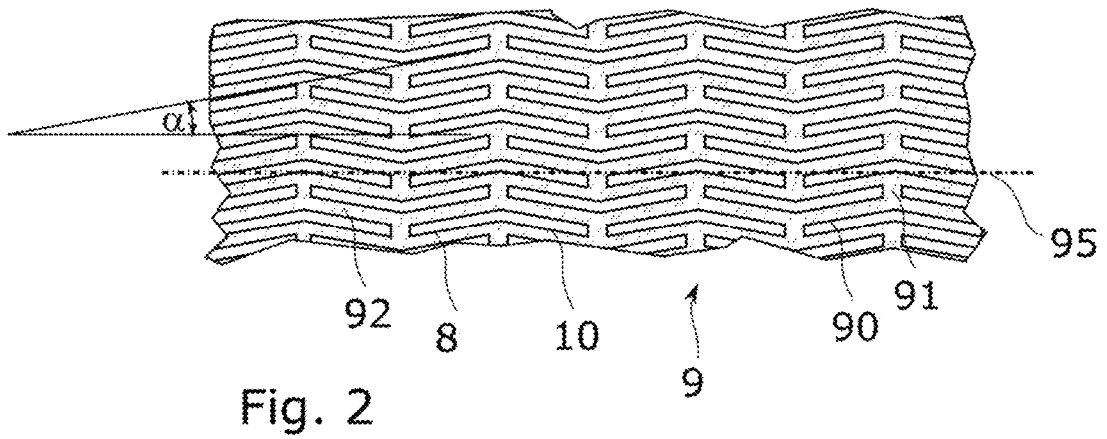
FIG. 2 shows a first section of the element.

FIG. 2 is a schematic and not drawn to scale depiction of a portion of first section 9. As can be seen, first section 9 comprises an arrangement of openings 90 and interconnectors 91. This generally leads to section 9 having a higher flexibility than section 11 and 13. Generally, the first section 9 may be structured in a way so that the stresses at the surfaces generated by bending are reduced by at least 50% compared to an unstructured element of the same thickness. Alternatively or additionally, the first section 9 is structured so that the stress at the surface of the first section due to bending changes by at most 10% within a thickness range of the element 1 from 200 μm to 2 mm.

Further, as already shown in FIG. 1, first section 9 defines a bending direction 95 for second sections 11, 13 (not shown here). Bending direction 95 may also be understood as bending axis 95 and terms bending axis and bending direction are used as synonyms in the scope of the disclosure.

Figure 8:
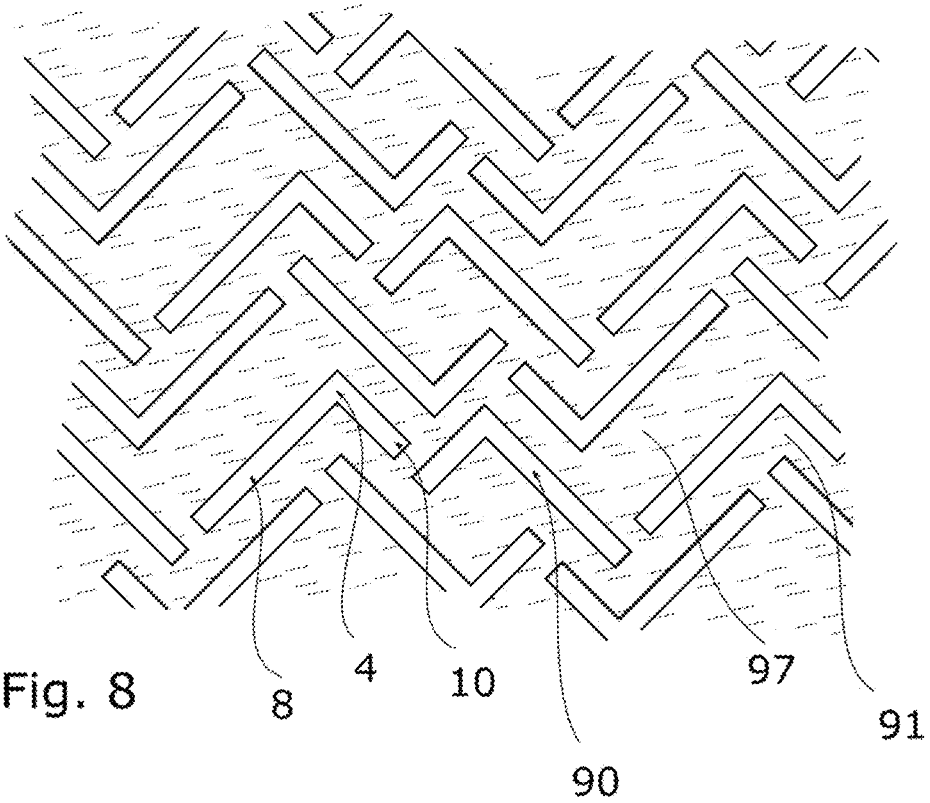
FIG. 8 shows an embodiment with hook-shaped openings having limbs of differing lengths.
Figure 9:
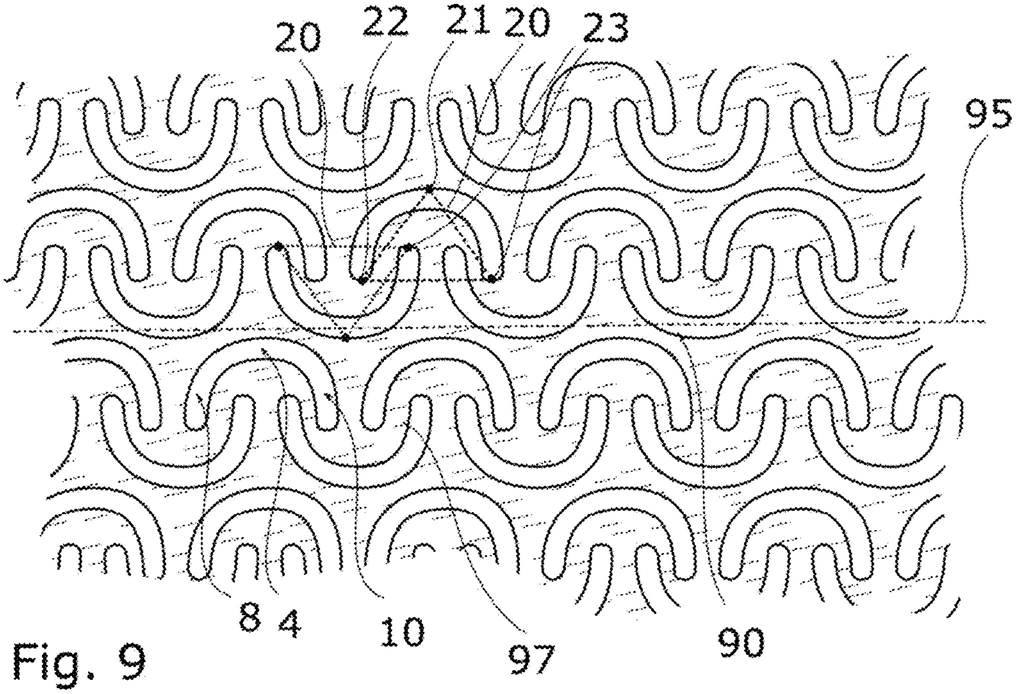
FIG. 9 shows an embodiment with rounded openings.

Here, openings 90 show a chevron- or V-like shape. Generally, without being restricted to the exemplary embodiment shown in FIG. 2, however, a chevron-like shape is not mandatory. Further, in general, though it may be preferred that several or even all openings are shaped as folds, only one opening 90 may be shaped as a fold. Here, a fold refers to a shape that, generally, comprises at least two limbs that intersect, thereby forming a vertex. A fold-like shape may take the shape, as in the exemplary depiction of FIG. 2, of a v or a chevron or inverse chevron. However, generally, a fold may be formed rather irregularly, as long as a change of direction occurs along its course. So, for example, an opening may also be formed as a circular section, as depicted schematically in FIG. 9, for example. Further, it is to be noted that not all openings within section 9 need to be shaped as folds and further, fold-shaped openings may not be formed identically. Different arrangements of fold-shaped openings and non-fold-shaped openings are shown schematically and not drawn to scale in FIG. 7. FIGS. 8 and 9 shown, by way of example, further fold-shaped openings 90, for example folds shaped like a circular section (FIG. 9) or like a checkmark (FIG. 8). In general, a vertex may be understood as a local point of extremum of a curve, in particular an extremum in direction along the bending axis, or, in the sense of the disclosure, of the shape of the opening when viewed in plain view of section 9.

Further, bending direction 95 has been indicated. As can be seen an angle α is drawn between bending direction 95 and one of the limbs of the openings 90. Further, it can be seen from the depiction in FIG. 2 that short interconnectors 91 are arranged that are, in the exemplary depiction of FIG. 2, perpendicular to bending axis 95. Interconnectors 91 of FIG. 2 are aligned in rows. A constant distance d is maintained between the interconnectors 91 in each row. Further, in bending direction 95, the interconnectors' position is shifted by half of distance d, resulting in the interconnectors' position in every second row to be the same. The angle a may also bei defined as the angle between a line connecting the centers of two adjacent interconnectors 91 within a row and a line connecting the center of an interconnector 91 to the center of the next interconnector 91 in an adjacent row. Generally, e.g., if the pattern of openings varies and/or is not symmetrical, an average angle a may be defined as the mean value of the various angles within the pattern. According to one embodiment, independent from the specific examples of the drawings, the angle is at least 5°, preferably at least 10°. However, according to a further embodiment, the angle should not be too large. This is inter alia advantageous to limit a projection of the protrusion 14 upon bending. In this regard, it is preferred that the angle is at most 60°, preferably at most 40°.

The highest point of interconnector 91 perpendicular to bending direction 95 is called the "upper ending", whereas the lowest point is called the "lower ending". To each lower ending of interconnector 91, two webs or bars 97, respectively are connected that are in turn connected to the upper endings of interconnectors 91 in the adjacent rows.

Figure 3:
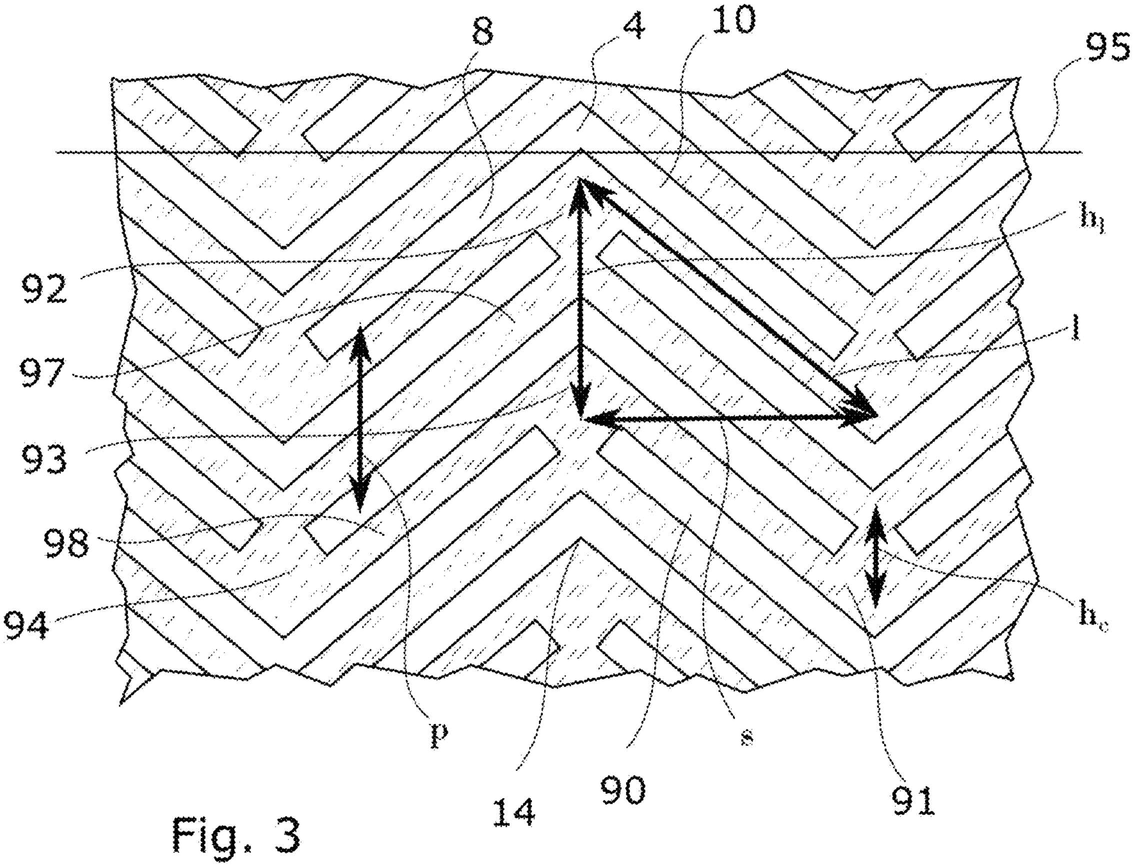
FIG. 3 shows a first section with differently shaped openings.

Reference is now made to FIG. 3, which shows a similar, but slightly different arrangement of openings 90 and interconnectors 91-94 as in FIG. 2. Here, interconnectors 91-94 are slightly "platelet-shaped" or "arrowhead-shaped". Further, to the lower ending of interconnector 92, two webs or bars 97 are attached that connect to upper endings of adjacent interconnectors 91, 94. Furthermore, to the lower endings of interconnectors 91, 94, two webs or bars 98 are attached connecting, in turn, to upper endings of adjacent interconnector 93.

Webs or, respectively, bars 97, 98 may, generally, be shaped with straight boundary lines, however, it is also possible and may even be preferred that bars are formed like a zig-zag, or have a sinusoidal shape, or be shaped rather irregularly, for example in order to minimize Moiré interferences with a pixel-array in case the element is used as a cover for such an array.

Further, width and length of a web or bar 97, 98 may vary and can be optimized in order to provide for a high mechanical strength, e.g., high bending strength of first section 9 and, hence, element 1. Therefore, by way of example, it may be preferred to shape interconnectors 91 in a more platelet-like or "arrowhead-like" way, as in FIG. 3 instead of the more rectangular shape of interconnectors 91 in FIG. 2.

The fold-like shape of at least one opening 90 is in general very advantageous in terms of providing for a high flexibility of element 1. This will be illustrated now with reference to FIGS. 4 and 5, respectively.

Figure 4:
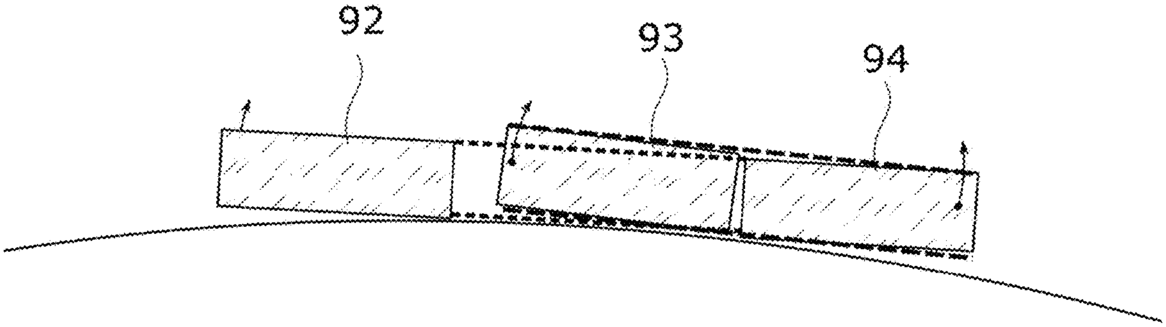
FIG. 4 is a side view of a first section deformed due to bending.

FIG. 4 is a schematic and not drawn to scale side view of first section 9 of FIG. 3 while bent. In this view, the bending axis extends along the viewing direction. With respect to the embodiment of FIG. 3, the upper ends of interconnectors 92 and 93 and the lower end of interconnector 94 slightly protrude, that is, the tip shaped ends of interconnectors 92, 93, 94 are lifted. This significantly allows for stress reduction in the attached bars (not shown here). Inventors have found that be careful selection of the dimensions of bars and interconnectors, bar length may be increased, which allows for an increase in bendability of first section 9 and, therefore, element 1.

Figure 5:
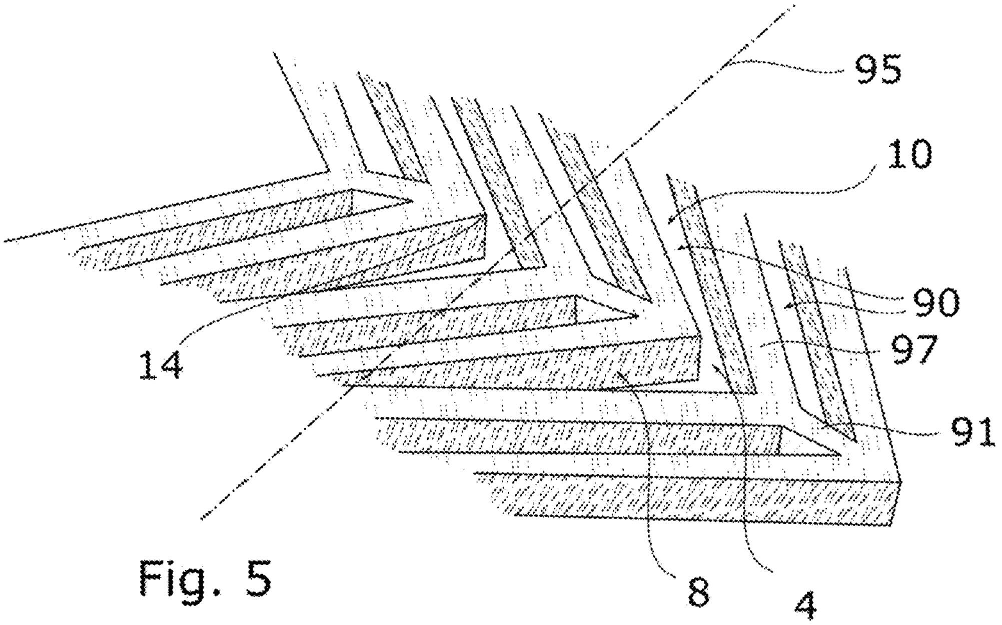
FIG. 5 shows a perspective view of a bent first section.

FIG. 5 is a depiction of a portion of section 9 as in FIG. 2. As can be seen, element 1 has been bent along direction 95. Section 9 comprises at least two fold-shaped openings 90 that are adjacent to each other. Interconnector 91 forms protrusion 14. Protrusion 14 is formed at vertex 4, the intersection of limbs 8, 10 of opening 90.

The inventors further found that a preferred parameter range for interconnectors' dimension may, for a given thickness d and Young's modulus E of the material of element 1 as well as the preferred minimum bending radius, may be found if at least one, preferably if both of the following relationships are satisfied:

$$\frac{E\times d}{2\times R}\times\arctan\left(\frac{h_l}{l}\right) < 1000\ \text{MPa} \tag{1}$$

$$\frac{E\times d}{2\times l}\times\arctan\left(\frac{p}{R}\right) < 1000\ \text{MPa} \tag{2}$$

In equation (1), $h_l$ is a component of length l of bar 97 perpendicular to bending direction 95 as shown in FIG. 3, and s is a component of length l in parallel to bending direction 95. Further, p is the periodic length of the arrangement of openings and interconnectors, and is the distance between one interconnector and a further interconnector two rows further. In some embodiments, however, there may not be a translational symmetry of the pattern of openings. In this case, the length p is the average value of the distance.

From a manufacturer's point of view, it may be preferred to produce identically shaped openings 90 and interconnectors 91 that are arranged in a periodic pattern, wherein p is the periodic length. However, it may also be contemplated to arrange openings, interconnectors and bars not in a periodic, but in an aperiodic pattern rather. This might be preferred in terms of minimizing or even totally supressing Moiré interference effects. In that case, p is understood as the average periodic length.

Figure 6:
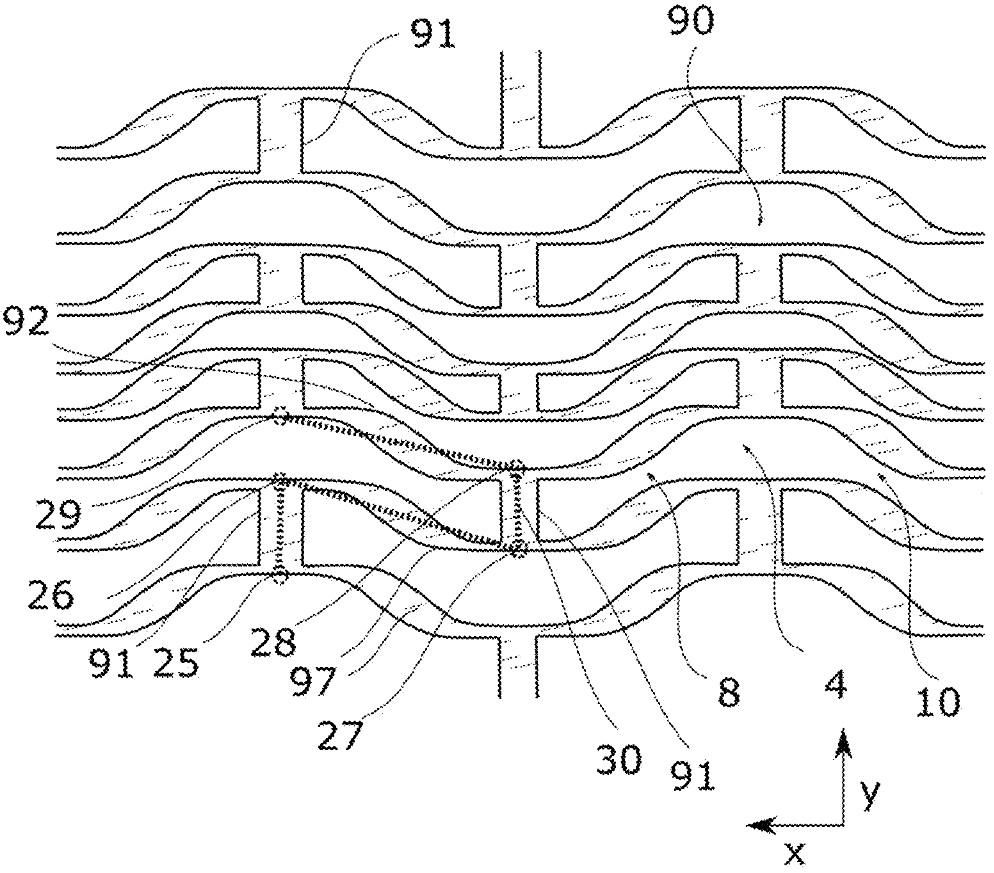
FIG. 6 shows an element with aperiodically arranged openings.

An example of such an aperiodic structure is shown in FIG. 6. Here, bars and interconnectors alike have differing lengths and width, and further, bars have irregularly shaped boundaries. As can be seen, openings 90 are each shaped as a fold, that is, with two limbs 8 and 10 that intersect thereby forming vertex 4.

Figure 7:
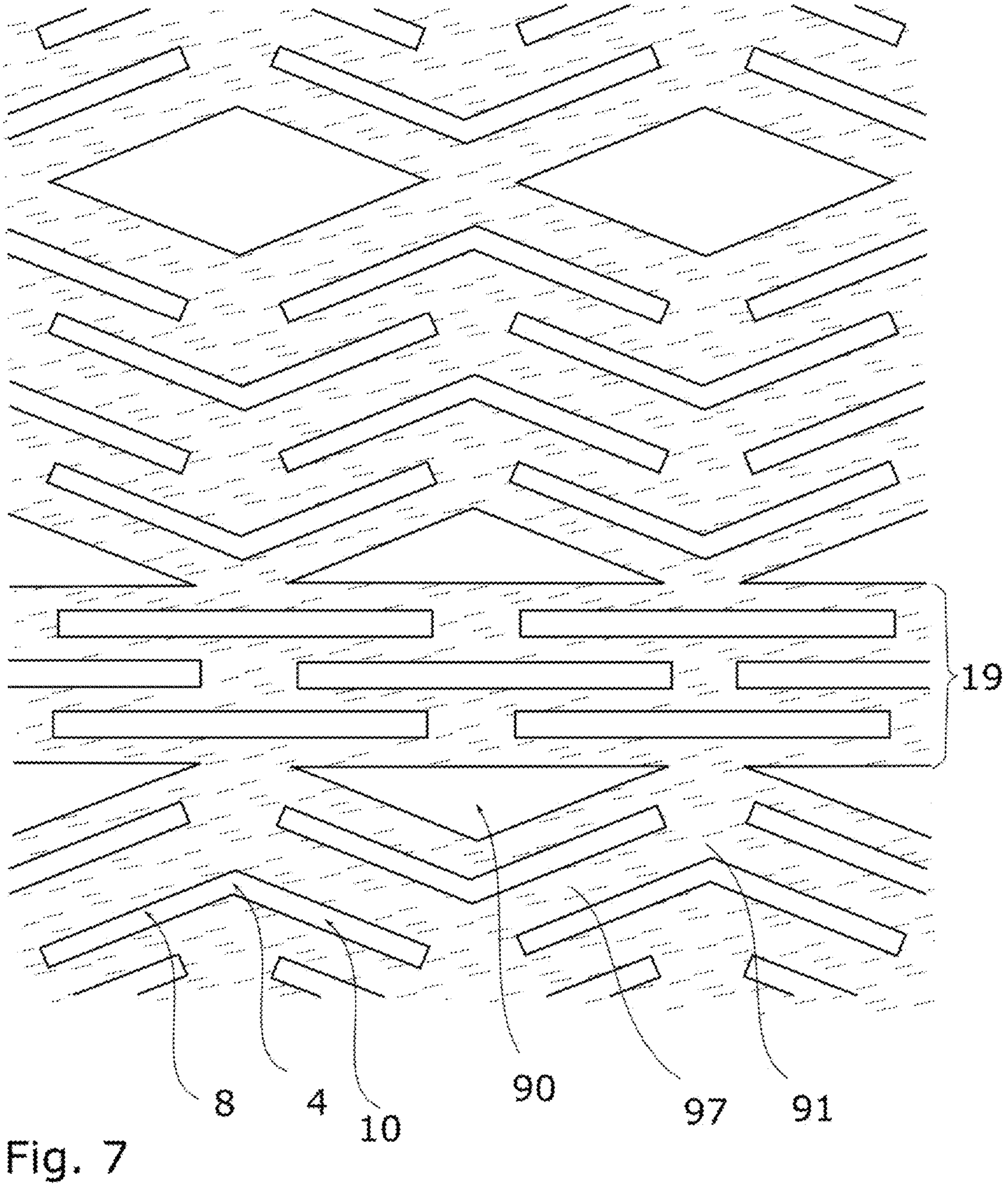
FIG. 7 shows an embodiment having a combination of differently shaped openings.

FIG. 7 shows a further example of an arrangement of openings 90, interconnectors 91 and bars 97 of a first section 9. Here, not all openings 90 are fold-shaped. Rather, at least one portion 19 of section 9 comprises straight shaped openings 90 (in comparison to fold-shaped openings 90).

FIGS. 8 and 9 depict, by way of example, further first sections 9 of element 1.

FIG. 8 depicts schematically and not drawn to scale first section 9 comprising openings 90 that are shaped as a fold. Here now, limb 10 is shorter than limb 8, so that the shape of opening 90 resembles that of a checkmark.

FIG. 9, in turn, depicts schematically and not drawn to scale first section 9 comprising openings 90 that are shaped as circular sections, that is, in the exemplary embodiment shown in FIG. 9, as semi-circles. Limbs 8 and 10 intersect at vertex 4.

It will be clear to the person skilled in the art that other shapes of openings 90 than those depicted in the figures of the disclosure are also possible, as long as the openings 90 are fold-shaped that is, comprising two limbs that intersect, thereby forming a vertex. Therefore, generally, one may also contemplate zig-zag-like openings that comprise several vertices, or else a more irregularly shaped opening. The shape of the openings 90 comprising limbs 8, 10 and a vertex 4 may also characterised in an alternative or additional way by defining a triangle that connects the ends of the limbs 8, 10 with the vertex 4. Specifically, the openings 90 are formed so that apex points 21, 22, 23 can be defined forming the edges of a triangle 20. The apex points 21, 22, 23 are defined as the points of the edge of the respective opening 90, where a parallel line to the bending axis touches the edge when shifted vertically to the bending axis 95. Specifically, the point 21 as shown in FIG. 9 is the point, where the parallel line touches the edge of the opening 90 at the vertex 4 and the points 22, 23 are the points where the parallel line touches the ends of the limbs 8, 10. A particular feature of the arrangement and shape of openings 90 according to this disclosure is that the openings 90 interlock in the direction perpendicular to the bending axis. This means, for example, that the limb of one opening 90 overlaps with the triangle 20 of an adjacent opening. This also means that, as shown in FIG. 9, one edge 23 of an opening 90 lies within the area of a triangle 20 of an adjacent opening 90, in particular, within the area of a triangle 20 of an adjacent row of openings 90. Thus, in short, the openings 90 are oriented and distributed within the first section 9 so that adjacent triangles 90 defined by apex points 21, 22, 23 of the openings 90 overlap in a way that one edge of a triangle lies within the area of an adjacent triangle 20. However, although this feature is advantageous to achieve low bending forces, the distance between the rows of interconnectors could be increased so that no overlap between the above mentioned triangles occurs. However, also in this case the tips of the interconnectors will lift upon bending.

The element 1 is preferably fabricated from glasses which can be easily structured to introduce the openings 90 and which maintain sufficient stability after the structuring.

According to a first embodiment of the composition the glass of the element comprises the following components in weight-%:

| | |
|---|---|
| $SiO_2$ | 30 to 85 |
| $B_2O_3$ | 3 to 20 |
| $Al_2O_3$ | 0 to 15 |
| $Na_2O$ | 3 to 15 |
| $K_2O$ | 3 to 15 |
| ZnO | 0 to 12 |
| $TiO_2$ | 0.5 to 10 |
| CaO | 0 to 0.1. |

According to a second embodiment of the composition the glass of the element comprises the following components in weight-%:

| | |
|---|---|
| $SiO_2$ | 55 to 75 |
| $Na_2O$ | 0 to 15 |
| $K_2O$ | 2 to 14 |
| $Al_2O_3$ | 0 to 15 |
| MgO | 0 to 4 |
| CaO | 3 to 12 |
| BaO | 0 to 15 |
| ZnO | 0 to 5 |
| $TiO_2$ | 0 to 2. |

According to a third embodiment of the composition, the glass of the element is essentially free from alkali oxides. The glass comprises the following components in weight-%:

| | |
|---|---|
| $SiO_2$ | 58 to 65 |
| $B_2O_3$ | 6 to 10.5 |
| $Al_2O_3$ | 14 to 25 |
| MgO | 0 to 3 |
| CaO | 0 to 9 |
| BaO | 3 to 8 |
| ZnO | 0 to 2. |

Preferably, in the composition of this glass the sum of the contents of MgO, CaO and BaO is within a range from 8 to 18 weight-%.

In a fourth embodiment the glass composition comprises the following components in weight-%:

| | |
|---|---|
| $SiO_2$ | 50 to 65 |
| $Al_2O_3$ | 15 to 20 |
| $B_2O_3$ | 0 to 6 |
| $Li_2O$ | 0 to 6 |
| $Na_2O$ | 8 to 16 |
| $K_2O$ | 0 to 5 |
| MgO | 0 to 5 |
| CaO | 0 to 7, preferably 0 to 1 |
| ZnO | 0 to 4, preferably 0 to 1 |
| $ZrO_2$ | 0 to 4 |
| $TiO_2$ | 0 to 1, preferably essentially no $TiO_2$. |

Further, the glass may contain 0 to 1 weight-%: $P_2O_5$, SrO, BaO; fining agents in an amount of 0 to 1 weight-%, preferably $SnO_2$, $CeO_2$ or $As_2O_3$.

According to one embodiment the element 1 is chemically toughened to increase the mechanical strength. Chemical toughening involves an ion exchange within the glass as the brittle material, wherein ions of the glass are exchanged by larger ions in a region of the glass adjacent to the surface so that the larger ions impart a compressive stress to the glass. Usually, alkali ions are exchanged to effect the toughening. Thus, the above listed glasses are suitable for chemical toughening as far as they contain a sufficient amount of alkali ions. Further, it is also possible to temper the glass to provide a compressive stress zone at the surface. Tempering or thermally toughening involves heating the glass until it softens and then rapidly cooling the glass element so that the surface contracts stronger than the glass in the bulk of the element. Thermal toughening is particular effective for thicker glass elements.

For some applications, a closed surface of the element 1 would be desirable. For this purpose, the openings 90 may be filled with organic materials, i.e., plastics, rubbers, or adhesives. Depending on the application, it may also be useful to leave some of the openings 90 open. Generally, in particular for using the element as a display cover, it may be desirable to fill the openings 90 with a transparent material. Thus, generally and without restriction to the specific example as depicted, an element 1 is provided wherein at least a subset or a part of the number of openings 90 is filled with plastic, preferably a transparent plastic. Preferably, the openings 90 are closed by the fillings. However, it would also be possible to provide fillings with one or more openings, e.g., openings that form thin channels.

According to a refinement of the embodiment with the plastics filled openings 90 it is contemplated that the plastic is chosen and adapted so that the bending force due to a deflection of the element is changed by at most 30%, preferably at most 20%, in particular at most 10%, especially preferred by at most 1%. This change is measured relative to a configuration with open openings 90, i.e., without plastic present in the openings 90. In practice, this feature can be easily verified by measuring the reaction force of the element 1 upon deflection with the openings 90 filled and then removing the plastic and repeat the measurement. Generally, without restriction to the above conditions of the reaction force, the plastics may be or at least contain an elastomer. This keeps the plastics filling sufficiently flexible to avoid a large increase in stiffness.

According to a further refinement, the plastic is transparent. In particular, the plastic may have a refractive index matching the refractive index of the brittle material of the element 1. Achieving a perfect match may be not necessary. Rather, within this disclosure a match of the refractive indexes of plastic and brittle material is understood as a refractive index difference of less than 0.3, preferably less than 0.2, more preferably less than 0.15, more preferably less than 0.1, more preferably less than 0.05, more preferably less than 0.02, or less than 0.01, or less than 0.005, or even less than 0.002.

A suitable plastic may contain silicone as a polymer. Silicone is particularly suited to bound to a silicon containing inorganic brittle material such as most of the suitable glasses. As well, silicone can be both an elastomer and a transparent plastics.

In a further embodiment, within the first section 9, the surface of the element 1 is partly formed by the plastic. Depending on the application, this may not be favorable for the application of the element 1. For example, compared to the inorganic brittle material of the element 1, the plastic may provide less adherence for components or layers which are to be applied to one of the sides 3, 5. For this purpose, an optional inorganic layer may be deposited onto at least one of the sides 3, 5. According to one embodiment, silicon oxide is deposited as the inorganic layer. For example, a layer may be deposited by chemical vapor deposition (CVD) or by flame pyrolysis. If the layer spans over both the brittle material and the plastic 33, uniform surface properties are achieved despite the different materials of the element 1.

The element 1 as described herein can be used as a part for a great variety of articles. An article comprising a flat element 1 as described herein may for example be a flexible, in particular foldable display. Typically, due to the high flexibility of the element 1 imparted by the structuring of the first section, an article comprising the element 1 has at least two sections or parts movable with respect to each other.

According to one embodiment, an article comprising an element 1 of brittle material comprises a sandwich structure wherein the element 1 forms one layer of the sandwich structure.

Generally, the sandwich structure may comprise a laminate. In a preferred embodiment, the laminate may comprise organic layers, in particular polymer or plastic layers laminated to one side of the element 1. An organic layer may also comprise or consist of a silicone. As well, organic layers, in particular plastic or polymer layers may be laminated to both sides 3, 5 of the element 1. Thus, with at least one side 3, 5 of the element 1 being laminated to an organic layer such as a polymer layer, a sandwich structure is obtained that combines a high hardness of the brittle material such as glass with a high flexibility. The polymer layer can be laminated to element 1 by adhesives, i.e., optical clear adhesive, thus forming a further organic layer, or be coated to the surface of element 1 without glue. The coating of a protective layer such as chemical vapor deposition method (CVD), dip-coating, spin-coating, ink-jet, casting, screen printing, painting and spaying. However, the disclosure is not limited to those procedures. Suitable materials are also known in the art. For example they can comprise a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, cross-linking polyurethane resins, polymethacrylate reaction resins, and polyacrylate reaction resins.

In the case of lamimation, the polymer material can be selected for example from the group consisting of a silicone polymer, a sol-gel polymer, polycarbonate (PC), polyethersulphone, polyacrylate, polyimide (PI), an inorganic silica/polymer hybrid, a cycloolefin copolymer, a polyolefin, a silicone resin, polyethylene (PE), polypropylene, polypropylenepolyvinyl chloride, polystyrene, styrene-acrylonitrile copolymer, polymethyl methacrylate (PMMA), ethylene-vinyl acetate copolymer, polyethylene terephthalate (PET), polybutylene terephthalate, polyamide (PA), polyacetal, polyphenyleneoxide, polyphenylenesulfide, fluorinated polymer, a chlorinated polymer, ethylene-tetrafluoroethylene (ETFE), polytetrafluoroethylene (PTFE), polyvinyl chloride (PVC), polyvinylidene chloride (PVDC), polyvinylidene fluoride (PVDF), polyethylene naphthalate (PEN), a terpolymer made of tetrafluroethylene, a terpolymer made of hexafluoropropylene, and a terpolymer made of vinylidene fluoride (THV) or polyurethane, or mixtures thereof. The polymer layer can be applied onto element 1 by any known method.

Further embodiments of element 1 may also be found in Applicant's own application EP 3 936 485 A1.

The first section 9 can provide a hinge for the adjacent second sections 11, 13. The hinge may be so flexible that the element can be folded together so that the second sections 11, 13 are facing each other. Due to the folding and bulging outwards of the first section 9, generally, two concavely bent portions of the first section 9 are formed with an intermediate convexly shaped portion.

In the hitherto described embodiments the flexible first section 9 formed a continuous stripe between the second sections 11, 13 so as to provide a hinge joint between the second sections 11, 13. In another embodiment, the first section 9 is arranged between the second sections 11, 13 as well. However, according to this embodiment the first section 9 encompasses one of the second sections.

The element 1 as described herein can be produced with a method as described in DE 10 2018 100 299 A1 or PCT application PCT/CN2019/086830, which are incorporated herein by reference. A process is employed wherein a laser pre-scores the openings 90 in the element. The pre-scored element is then etched to produce the openings. Specifically, a method with the following steps can be employed: providing a plate shaped element 1 of a brittle material, directing and focusing the laser beam of a ultrashort pulsed laser onto the element 1, the laser beam having a wavelength at which the brittle material of the element 1 is transparent so that the laser beam can penetrate into the element 1, the laser beam being focused to produce an elongated focus within the element, the intensity of the laser beam being sufficient to produce a filament shaped damage zone within the element 1 along the focus, the laser beam being moved relative to the element to insert a plurality of filament shaped damage zones side by side along a multitude of ring shaped, or closed paths, etching by exposing the element to an etchant, the etchant intruding into the filament shaped damage zones so that the filament shaped damage zones are widened to form channels which combine due to the widening, so that the part of the element encompassed by the ring shaped paths detaches and openings 90 is produced so that least three sections are formed including a first section 9 and two second sections 11, 13, the second sections adjoining the first section so that the first section 9 is arranged between the second sections 11, 13, the first section 9 comprising the openings 90 so that the first section 9 has a higher flexibility than the second sections 11, 13.

According to a refinemenent, after etching, chemical toughening the element 1 may be performed.

According to a further embodiment depicted schematically and not drawn to scale in FIGS. **10*a*-10*d*, element 1 comprises at least five sections, these at least five sections including three second sections 11, 12, 13 and two first sections 9*a*, 9*b*, the first sections 9*a*, 9*b* each being arranged between two second sections 11, 12, 13 so that the first sections 9*a*, 9*b* form hinges for the second sections 11, 12, 13, and wherein the first sections 9*a*, 9*b* are preferably formed differently. Such an element 1 is depicted in FIG. 10*a*, wherein first sections 9*a*, 9*b* are indicated as being formed differently by using differently oriented hatchings. In the exemplary embodiment of FIGS. 10*a-d*, first section 9*a* is arranged between second sections 11 and 12, and first section 9*b* is arranged between second sections 12 and 13. In general, without being restricted to the exemplary embodiment of element 1 depicted schematically and not drawn to scale in FIGS. 10***a*-10*d*, element 1 may comprise more than five sections, for example, seven sections, wherein four of these seven sections are formed as second sections and three sections formed as first sections that may act as hinges between the second sections.

In case of such an element 1, element 1 may be folded into an S-shape or zig-zag like, for example, as has been schematically and not drawn to scale depicted in FIG. 10*b*. That is, element 1, in the exemplary embodiment depicted here, is suited for double-folding, wherein preferably, upon folding, one of the first sections, for example, first section 9*a*, is formed as an "in-folding", and the other first section, for example, first section 9*b*, is formed as an "out-folding". In-folding and out folding are here understood with respect to sides 3, 5 of element 1, wherein side 3 is, here, adapted to be directed towards a device, for example, a mobile phone or the like, and wherein side 5 is understood here as being directed towards the outside of a device. In that case, the in- and out-folding areas may have different bending angles, and therefore, it may be preferable that first sections 9*a*, 9*b* are formed differently. For example, the minimum radius of curvature of the out-folding may be greater than the minimum radius of the in-folding.

For example, the first section that will form, upon folding, an outfolding, that is, first section 9*b* in the example depicted in FIG. 10*b* may be optimized for such a greater minimum radius of curvature, thereby having a greater mechanical strength.

Such an element 1 comprising first sections 9*a*, 9*b* being formed differently, for example, may be obtained by carefully adjusting the structuring parameters so that structures formed in sections 9*a*, 9*b* differ from each other, for example in width and/or length of structures or openings 90 (not depicted here) formed within element 9.

However, it is also possible and may even be preferred that both element 1 may be configured so that two first sections 9*a*, 9*b* result that may bend in the same direction, for example, so that two in-foldings may be obtained. Such an element 1 is depicted schematically and not drawn to scale in FIG. 10*c*. Such a configuration of element 1 may be preferred, as in that case, especially if first sections 9*a*, 9*b* are configured so as to form in-foldings, a display of a device is always protected, as side 5 is folded upon itself. Here too, preferably, sections 9*a*, 9*b* are formed differently, as one section, for example section 9*b*, may be adapted to form a "first in-folding" with a smaller minimum radius of curvature as the further first section 9*a* is adapted to form a "second in-folding", thereby requiring a greater minimum radius of curvature and may thus be formed with a greater mechanical strength. However, it is also possible that both first sections 9*a*, 9*b* are formed equally. In that way, second sections 11, 13 may be folded inwards so that they cover side 5 of section 12 in a door-like manner, that is, acting as wings of a door, as depicted schematically and not drawn to scale in FIG. 10*d*. Generally, the hinges formed by the structured first sections may have bending axes that do not need to be parallel. For example, the bending axes may be perpendicular with respect of each other. In this case, for example, the element 1 may be folded in two different directions.

Figure 11A:
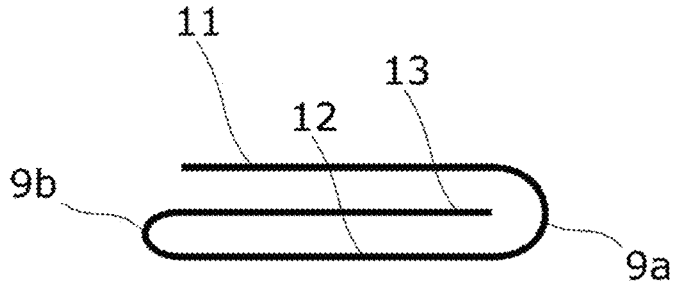
Figure 11B:
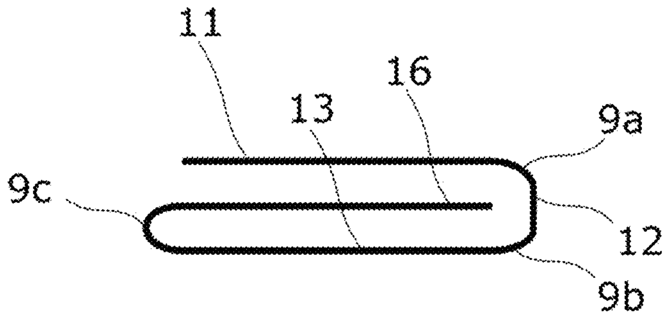

FIGS. 11*a*-11*b* show, in a schematic and not drawn to scale depiction, two embodiments of elements 1 according to the disclosure. In the embodiment depicted in FIG. 11*a*, first section 9*a* is adapted to form a first in-folding with a larger minimum radius of curvature, and first section 9*b* is adapted to form a second in-folding with a smaller minimum radius of curvature, similar to the embodiment depicted schematically and not drawn to scale in FIG. 10*c*, for example. Here, first section 9*a* is formed so that a single bending radius is obtained that does not vary within first section 9*a*, similar to the second first section 9*b*. This may be achieved by forming the pattern of openings, interconnectors and bars in a first section in a regular way, that is, with identically formed openings and an arrangement of openings, interconnectors and bars having translation symmetry. Such arrangements of openings, interconnectors and bars are shown, for example, in FIGS. 2, 3, 8, and 9.

However, it is also possible and may be preferred to form a first section—for example, first section 9*a*, in such a way that the minimum bending radius may vary within the first section. This may be achieved by arranging openings, interconnectors and bars differently throughout the section, for example, by changing the orientation and/or the shape of interconnectors and openings and/or by varying the length and/or width of interconnectors, bars and openings, such as, for example, shown in FIGS. 6 and 7 in a schematic and not drawn to scale way. Such an arrangement may result in a folding such as shown in FIG. 12*b*, for example, wherein the bending radius varies throughout first section 9, resulting in a "bulge-out" of first section 9 upon folding of element 11.

Further, it may be contemplated to form element in such a way that a small second section 12 is formed between first sections 9*a*, 9*b*, resulting in a folding comprising a non-bent section. This is shown schematically and not drawn to scale in FIG. 11*b*.

According to yet a further embodiment, the element 1 may be designed to be rolled up rather than folded. Such an embodiment can be easily achieved by adapting the widths of the first section and the second sections. Generally, the first section may have a width larger that one of the second sections, or even larger than the combined width of the second sections. Further, the second sections may be reduced in width to form rigid edges to stabilize the element 1. For example, the first section may constitute more than 75% of the overall width of the element 1, or even more than 85%. According to yet a further embodiment, the second sections may even be omitted.

Figure 12A:
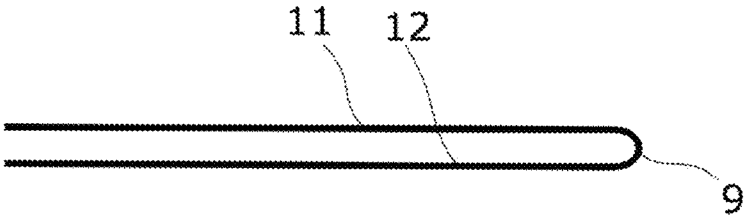
FIGS. 12*a*-12*c* shows further embodiments of elements in folded state.
Figure 12B:
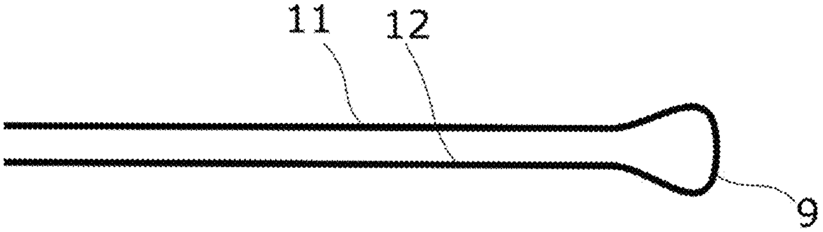
Figure 12C:
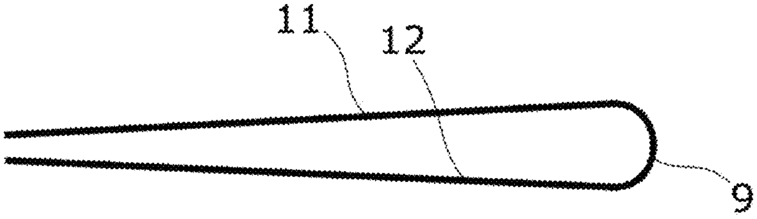

FIGS. 12*a*-12*c* depict several folded elements 1 wherein second sections 11, 12 are arranged in similar ways. For example, it may be contemplated to form element 1 in such a way that upon folding, second sections 11, 12 and 13 (if applicable) are arranged parallel to each other. For example, FIG. 12*a* depicts element 1 wherein first section 9 is formed so that upon folding, second sections 11, 12 are parallel to each other.

Also in FIG. 12*b*, wherein first section 9 is formed so that different minimum radii of curvature result throughout first section 9, which in turn results in a bulge-out of first section 9 upon folding, second sections 11, 12 are arranged in parallel. However, it is also possible and may be preferred to form first section 9 in such a way that a "negative" angle results upon folding, that is, outer edges of sections 11, 12 are closer to each other than the edges of sections 11, 12 with first section 9.

Figure 13:
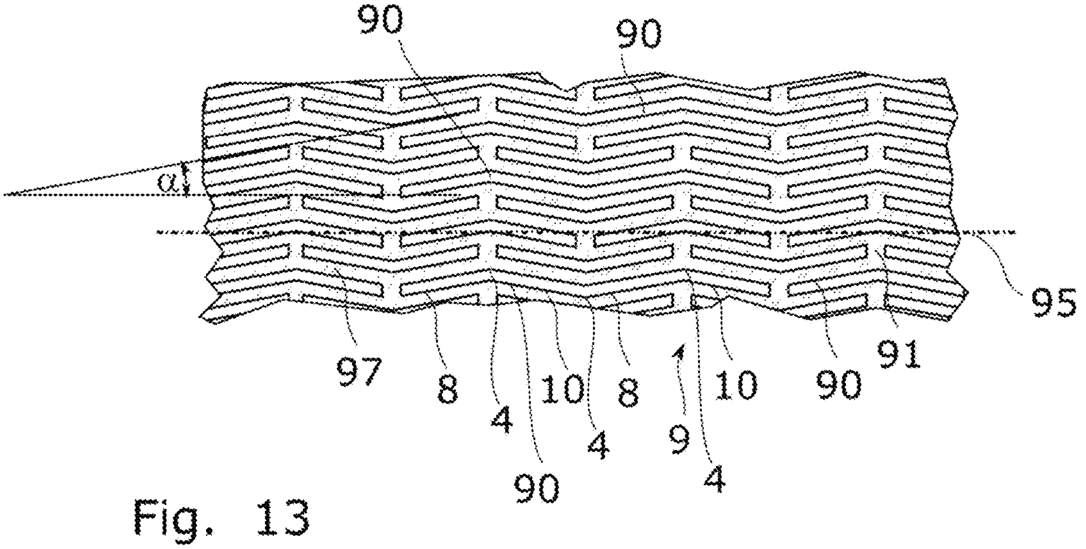
FIG. 13 shows a variant of a first section with openings having more than one vertex.

FIG. 13 shows a variant of a first section 9 with openings 90, wherein the openings have more than one vertex. The embodiments described so far have openings 90 with a single vertex 4. Although this embodiment is generally preferred, an embodiment with more than one vertex is also possible and may also be advantageous and preferable for specific applications. For example, depending on the pixel arrangement of a display covered by the element 1, openings 90 having more than one vertex 4 and/or more than two limbs 8, 10 may be advantageous to further reduce Moiré-effects. According to one refinement of this embodiment, all openings 90 of the first section 9 may have more than one vertex 4. However, it is possible to combine differently shaped openings 90. Thus, according to another refinement, the first section 9 comprises both at least one opening 90 with a single vertex 4 and at least one opening with more than one vertex 4. An example, which is a variant of the embodiment of FIG. 2 is depicted in FIG. 13. The part of the first section 9 shown in FIG. 13 has three openings 90 each having three vertices 4 along with a multitude of openings 90 having a single vertex 4. The openings with more than one vertex 4 and one of the openings with a single vertex 4 are marked with the reference sign 90. Of course, it is also possible to combine openings 90 in a first section 9 with more than one vertex but different numbers of vertices, e.g., openings 90 having two, three and four vertices 4.

The structuring of the first section 9 has been so far described on the basis of the shape of the openings 90. An alternative or additional description of a suitable structuring to overcome the drawbacks of the state of the art, particularly to provide increased flexibility and/or to reduce Moiré patterns is described in the following. Reference is made again to FIG. 6. As can be seen, five points 25, 26, 27, 28, 29 are marked. Point 25 is the apex of the vertex 4 of opening 90. Point 26 is the apex of the protrusion of interconnector 91 starting at point 25. Point 27 is the apex point of the protrusion of an interconnector 91 adjacent to the interconnector with apex point 26, whereby the interconnectors with points 26 and 27 are connected via a bar or web. In the shown example the interconnectors 91 are connected via bar 97. Point 28 is the apex point of a vertex 4 of an opening 90 at which the connector 91 with apex point 27 starts. Finally, point 29 is the apex point of a vertex of the opening 90 into which the interconnector 91 protrudes, wherein the interconnector has an apex point 26. Along these five points 25, 26, 27, 28, 29, a segmented path 30 can be defined. If starting the path from point 25 via points 26, 27, 28 towards point 29, it is obvious that the first two segments of the path (i.e., the segments starting at point 26 and starting at point 27) include an acute angle, whereas the segments starting at point 28 include an obtuse angle.

The path 30 describing the structuring of the first section 9 may also be described in a different, more general manner. According to a further embodiment of the disclosure, independent from whether or not at least one opening 90 is shaped as a fold that comprises at least two limbs 8, 10 that intersect, thereby forming a vertex 4, an element 1 is provided having the following features:

The element 1 of an inorganic brittle material with opposed sides 3, 5 and a circumferential edge 7 comprises at least three sections, the at least three sections including a first section 9 and two second sections 11, 13, the second sections adjoining the first section so that the first section 9 is arranged between the second sections 11, 13, the first section 9 comprises an arrangement of openings 90 and interconnectors 91 connected by webs or bars 97 so that the first section 9 has a higher flexibility than the second sections 11, 13, whereby the openings 90 are arranged and shaped so that a path can be defined, the path running along an interconnector 91, then further along a bar 97 connected thereto, then along another interconnector 91 at the end of the bar 97 and then along another bar 97 at the opposite end of the latter interconnector 91 and the path being composed of line segments, each segment starting and ending at the edge of an opening.

Preferably, the segments each start and end at an apex point 25, 26, 27, 28, 29 of either an opening 90 or a protrusion of an interconnector 91. It is preferred that adjacent line segments of this path 30 include at least one acute angle and at least one obtuse angle.

Figure 14:
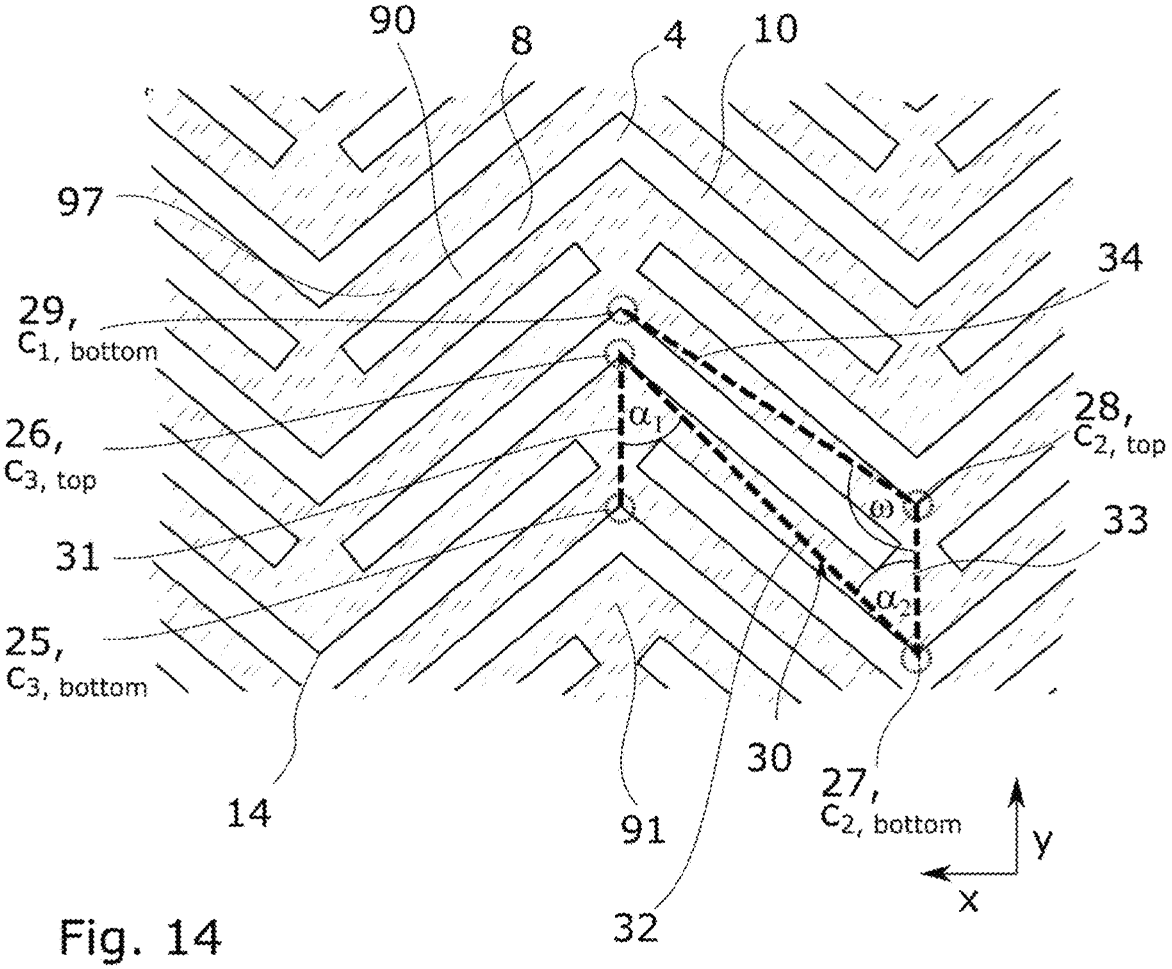
FIG. 14 shows the embodiment of FIG. 3 together with a path characterizing the structuring and arrangement of the openings in the first section.

Further, according to a preferred embodiment, the sequence of line segments include two acute angles and one obtuse angle. This feature characterizes the specific structure with a plurality of interlocking and generally fold shaped openings 90 in the first section 1 of the element 1. As the path 30 starts at the edge of an opening 90 at an interconnector 91 and then follows the interconnector 91, the line segment between the points 25 and 26 typically extends along the y-direction, with the x-direction extending parallel to the bending axis. The x- and y-coordinate axes are shown in FIG. 14. For periodic patterns, the path 30 or the points 25-29 form a structure which can be regarded as a common unit cell of the pattern.

To calculate the stresses within the first section, each point is defined by its x- and y-position in a coordinate-system. Then, for every unit-cell in the first section, maximum stresses can be calculated. In the following, for the sake of the mathematical treatment, the points 25-29 are assigned to the following symbols: Point 25 is referred to as $c_{3,\ bottom}$, Point 26 is referred to as $c_{3,\ top}$, Point 27 is referred to as $c_{2,\ bottom}$, Point 28 is referred to as $c_{2,\ top}$, and Point 29 is referred to as $c_{1,\ bottom}$. For the sake of clarity, FIG. 14 shows another example of a first section 9 with one path 30 and the corresponding points 25 to 29 and the assigned above references. For this example, the same structuring as in the example of FIG. 3 has been chosen. Further, the segments 31, 32, 33, 34 of the path 30 are annotated. The acute angles are referred to as $\alpha_1$ and $\alpha_2$ and the obtuse angle is annotated with the symbol $\omega$.

Using the points 25-29 and the segments of the path, maximum stresses on the bars 97 and interconnectors 91 can be calculated. According to a preferred embodiment, the arrangement, size and shape of the openings 90 is chosen so that the following conditions are met for at least one path upon bending of the element 1:

$$\frac{E \cdot d \cdot \arctan\left(\arctan\left(\frac{c_{1,bottom,y} - c_{2,top,y}}{R}\right)\right)}{2 \cdot \sqrt{(c_{1,bottom,x} - c_{2,top,x})^2 + (c_{1,bottom,y} - c_{2,top,y})^2}} < 10.000\ \text{MPa} \tag{i}$$

$$\frac{E \cdot d \cdot \arctan\left(-\arctan\left(\frac{c_{1,bottom,y} + c_{2,top,y} - c_{3,top,y} - c_{2,bottom,y}}{2 \cdot R}\right)\right)}{2 \cdot \sqrt{(c_{2,bottom,x} - c_{3,top,x})^2 + (c_{2,bottom,y} - c_{3,top,y})^2}} < 10.000\ \text{MPa} \tag{ii}$$

In the formulas (i) and (ii), the variable "E" is the Young modulus. d refers to the thickness of the element 1. The variables $c_{1,\ bottom,y}$, $c_{2,\ bottom,y}$, $c_{2,\ top,y}$, $c_{3,\ top,y}$ refer to the y-coordinates of the points 29, 27, 28 and 26 in this order. Similarly, the variables $c_{1,\ bottom,x}$, $c_{2,\ top,x}$, $c_{2,\ bottom,x}$, and $c_{3,\ top,x}$ refer to the x-coordinates of the points 29, 28, 27 and 26 in this order. As mentioned above, the x-coordinate extends along the direction of the bending axis and the y-direction is perpendicular thereto.

Preferably, the openings and their arrangement are designed so that the maximum stress generated according to the above formulas is not only less than 10000 MPa, but even less than 5000 MPa upon bending of the element 1. More preferably, the maximum stress is less than 3000 MPa or even less than 2000 MPa.

LIST OF REFERENCE NUMERALS

1 Element

3, 5 Sides of 1

4 Vertex
7 Circumferential edge
8, 10 limb
9, 9*a*, 9*b* First section of 1
11, 12, 13 Second section of 1
14 Protrusion
15 Boundary line between 9 and 11, 9 and 13
19 Portion of first section
20 Triangle
21 Apex point at vertex 4
22, 23 Apex point at end of limb 8, 10
25, 28, 29 Apex point of vertex 4 of opening 90
26, 27 Apex point of interconnector 91
30 Path along points 25-29
31, 32, 33, 34 Segments of 30
90 Opening
91, 92, 93, 94 Interconnectors
95 Bending axis
97, 98 Bar

What is claimed is:

1. An element of an inorganic brittle material, comprising:
two opposed sides;
a circumferential edge
a first section; and
two second sections, the two second sections adjoining the first section so that the first section is between the two second sections, the first section comprising an arrangement of openings and interconnectors so that the first section has a higher flexibility than the two second sections, wherein the arrangement of openings has a first opening shaped as a fold that comprises two limbs intersecting to form a single vertex.

2. The element of claim 1, wherein the arrangement of openings has two of the first opening with a protrusion between the two of the first openings.

3. The element of claim 1, comprising a feature selected from a group consisting of: the arrangement of openings defining a bending direction for the two second sections with an angle drawn between the bending direction and one of the two limbs; the arrangement of openings defining a bending direction for the two second sections with an angle drawn between the bending direction and one of the interconnectors; the arrangement of openings are oriented and distributed so that adjacent triangles defined by apex points of openings overlap so that one edge of a triangle lies within the area of an adjacent triangle; and any combinations thereof.

4. The element of claims 3, further comprising a length (l) of a bar, a component ($h_l$) of the length (l) perpendicular to the bending direction, a component(s) of the length (l) in parallel to the bending direction, a Young's modulus (E) of a material of the element, a thickness (d), a periodic length (p) of the arrangement of openings and interconnectors, and a bending radius (R) of the element that satisfy a relationship selected from a group consisting of:

$$\frac{E\times d}{2\times R}\times\arctan\left(\frac{h_l}{l}\right)<1000\text{ MPa},\ \frac{E\times d}{2\times l}\times\arctan\left(\frac{p}{R}\right)<1000\text{ MPa},$$

and combinations thereof.

5. The element of claim 3, wherein the arrangement of openings has two of the first opening that are arranged side by side forming a row, the row being parallel to the bending direction.

6. The element of claim 4, whereby the arrangement of openings are arranged and shaped so that a path can be defined along a first of the interconnectors, then along a bar connected thereto, then along a second of the interconnectors at the end of the bar, and then along another bar at an opposite end of the second interconnector, wherein the path comprises line segments where each segment starts and ends at the edge of a respective opening, wherein adjacent line segments of the path include at least one acute angle and at least one obtuse angle.

7. The element of claim 6, whereby the adjacent line segments each start and end at an apex point of either one of the openings or a protrusion of one of the interconnectors.

8. The element of claim 7, wherein the arrangement of openings have openings that are sized and shaped so that, upon bending, satisfies:

$$\frac{E\cdot d\cdot\arctan\left(-\arctan\left(\frac{c_{1,bottom,y}+c_{2,top,y}-c_{3,top,y}-c_{2,bottom,y}}{2\cdot R}\right)\right)}{2\cdot\sqrt{(c_{2,bottom,x}-c_{3,top,x})^2+(c_{2,bottom,y}-c_{3,top,y})^2}}<10.000\text{ MPa}\tag{i}$$

$$\frac{E\cdot d\cdot\arctan\left(-\arctan\left(\frac{c_{1,bottom,y}+c_{2,top,y}-c_{3,top,y}-c_{2,bottom,y}}{2\cdot R}\right)\right)}{2\cdot\sqrt{(c_{2,bottom,x}-c_{3,top,x})^2+(c_{2,bottom,y}-c_{3,top,y})^2}}<10.000\text{ MPa},\tag{ii}$$

wherein "E" is the Young modulus and d denotes a thickness of the element, and
wherein the variables $c_{1,\ bottom,y}$, $c_{2,\ bottom,y}$, $c_{2,\ top,y}$, $c_{3,\ top,y}$ refer to y-coordinates and variables $c_{1,\ bottom,x}$, $c_{2,\ top,x}$, $c_{2,\ bottom,x}$, $c_{3,\ top,x}$ refer to x-coordinates of the apex points along the path, and
wherein the x-coordinate extends along the bending direction and the y-direction is perpendicular thereto.

9. The element of claim 1, wherein the first section has a flexibility that is at least 2 times higher than the two second sections.

10. The element of claim 1, wherein the first section has a flexibility that is at least 4 times higher than the two second sections.

11. The element of claim 1, wherein the first section forming a hinge for the two second sections.

12. The element of claim 1, further comprising another second section and another of the first section, with the first sections being arranged between two second sections, respectively to form hinges therebetween, wherein the first sections are formed differently from one another.

13. The element of claim 1, wherein the inorganic brittle material comprises glass having a composition, in weight-%, comprising:

| | |
|---|---|
| $SiO_2$ | 30 to 85, |
| $B_2O_3$ | 3 to 20, |
| $Al_2O_3$ | 0 to 15, |
| $Na_2O$ | 3 to 15, |
| $K_2O$ | 3 to 15, |
| ZnO | 0 to 12, |
| $TiO_2$ | 0.5 to 10, |
| CaO | 0 to 0.1. |

14. The element of claim 1, wherein the inorganic brittle material comprises glass having a composition, in weight-%, comprising:

| | |
|---|---|
| $SiO_2$ | 55 to 75, |
| $Na_2O$ | 0 to 15, |
| $K_2O$ | 2 to 14, |
| $Al_2O_3$ | 0 to 15, |
| MgO | 0 to 4, |
| CaO | 3 to 12, |
| BaO | 0 to 15, |
| ZnO | 0 to 5, |
| $TiO_2$ | 0 to 2. |

15. The element of claim 1, wherein the inorganic brittle material comprises glass having a composition, in weight-%, comprising:

| | |
|---|---|
| $SiO_2$ | 58 to 65, |
| $B_2O_3$ | 6 to 10.5, |
| $Al_2O_3$ | 14 to 25, |
| MgO | 0 to 3, |
| CaO | 0 to 9, |
| BaO | 3 to 8, |
| ZnO | 0 to 2, |

wherein the composition is essentially free from alkali oxides.

16. The element of claim 1, wherein the inorganic brittle material comprises glass having a composition, in weight-%, comprising:

| | |
|---|---|
| $SiO_2$ | 50 to 65, |
| $Al_2O_3$ | 15 to 20, |
| $B_2O_3$ | 0 to 6, |
| $Li_2O$ | 0 to 6, |
| $Na_2O$ | 8 to 17, |
| $K_2O$ | 0 to 5, |
| MgO | 0 to 5, |
| CaO | 0 to 7, |
| ZnO | 0 to 4, |
| $ZrO_2$ | 0 to 4, |
| $TiO_2$ | 0 to 1. |

17. The element of claim 1, further comprising a feature selected from a group consisting of: the arrangement of openings having openings of a varying width; the arrangement of openings having openings with an irregular contour; the arrangement of openings having openings at least partially filled with plastic; the inorganic brittle material comprising chemically toughened glass; the inorganic brittle material comprising thermally toughened glass; the inorganic brittle material comprising chemically toughened glass with a compressive stress higher than 100 MPa; the inorganic brittle material comprising chemically toughened glass with a compressive stress higher than 250 MPa; the inorganic brittle material comprising chemically toughened glass with a compressive stress lower than 1500 MPa; the inorganic brittle material comprising chemically toughened glass with a compressive stress lower than 1300 MPa; the inorganic brittle material comprising chemically toughened glass with a DoL higher than 1 μm; the inorganic brittle material comprising chemically toughened glass with a DoL higher than 3 μm; the inorganic brittle material comprising chemically toughened glass with a DoL lower than 0.4·t; the inorganic brittle material comprising chemically toughened glass with a DoL lower than 0.3·t; the inorganic brittle material comprising chemically toughened glass with a bending radius of the first section that is below 500t without breakage, where t is the glass thickness; the inorganic brittle material comprising chemically toughened glass with a bending radius of the first section that is below preferably below 30t without breakage, where t is the glass thickness; and combinations thereof.

18. The element of claim 1, the arrangement of openings having openings at least partially filled with plastic, wherein the plastic has a feature selected from a group consisting of: provides a bending force that is changed by at most 30% compared to the bending force without the plastic; the plastic is transparent; the plastic has a refractive index that matches the refractive index of the brittle material; the plastic comprises an elastomer; and the plastic comprises silicone.

19. An article comprising:

a flat element an inorganic brittle material, the flat element having two opposed sides, a first section, and two second sections, the two second sections adjoining the first section so that the first section is between the two second sections, the first section comprising an arrangement of openings and interconnectors so that the first section has a higher flexibility than the two second sections and forms a hinge for the two second sections, wherein the arrangement of openings has a first opening shaped as a fold that comprises two limbs intersecting to form a single vertex.

* * * * *